US00RE35726E

United States Patent [19]

Miller et al.

[11] E Patent Number: Re. 35,726

[45] Reissued Date of Patent: Feb. 10, 1998

[54] GAUGE BLOCK HAVING CHECK VALVE WITH ORIFICE

[75] Inventors: Richard W. Miller; Max Gilbert, both of Denton, Tex.

[73] Assignee: Victor Equipment Company, Denton, Tex.

[21] Appl. No.: 761,212

[22] Filed: Dec. 6, 1996

Related U.S. Patent Documents

Reissue of:

[64] Patent No.: 5,373,873
Issued: Dec. 20, 1994
Appl. No.: 151,361
Filed: Nov. 12, 1993

[51] Int. Cl.[6] ..... B65B 1/04; B65B 3/04

[52] U.S. Cl. ..... 141/18; 141/46; 141/65; 138/40; 138/41; 138/42; 138/43; 138/44; 138/45; 137/883

[58] Field of Search ..... 141/18, 4, 21, 141/46, 47, 95, 65, 66, 197; 137/513.3, 557, 883, 606; 128/204.18, 205.24; 138/40–45

[56] References Cited

U.S. PATENT DOCUMENTS

| | | |
|---|---|---|
| 2,034,750 | 3/1936 | Deming . |
| 2,713,874 | 7/1955 | Sundstrom . |
| 3,794,077 | 2/1974 | Fanshier . |
| 3,995,607 | 12/1976 | Ludwig et al. . |
| 4,100,894 | 7/1978 | Tamura . |
| 4,341,245 | 7/1982 | Daicho et al. . |
| 4,428,396 | 1/1984 | Wall . |
| 4,474,189 | 10/1984 | Brown . |
| 4,860,795 | 8/1989 | Oten . |
| 4,901,761 | 2/1990 | Taylor . |
| 5,037,063 | 8/1991 | Kerger et al. . |
| 5,081,847 | 1/1992 | Anderson, Jr. . |
| 5,320,135 | 6/1994 | Pierrou . |
| 5,323,773 | 6/1994 | Kobayashi . |

*Primary Examiner*—Henry J. Recla
*Assistant Examiner*—Steven O. Douglas
*Attorney, Agent, or Firm*—Senniger, Powers, Leavitt & Roedel

[57] ABSTRACT

A gauge block assembly for use in conjunction with the refilling of high pressure gaseous oxygen cylinders. The gauge block is used in an oxygen transfill header or manifold and includes a gas transfer control unit that allows rapid evacuation of the spent oxygen cylinder but that prevents rapid refilling of the oxygen cylinder with fresh oxygen. The gas transfer control unit includes a valve assembly having a restricted orifice therethrough. During the evacuation process, the check valve opens, bypassing the restricted orifice, to allow rapid evacuation of the oxygen cylinder at a first rate of flow. During the refilling process, the check valve closes. The incoming oxygen must flow through the restricted orifice at a second rate of flow less than the first rate of flow thereby regulating the flow of oxygen.

5 Claims, 2 Drawing Sheets

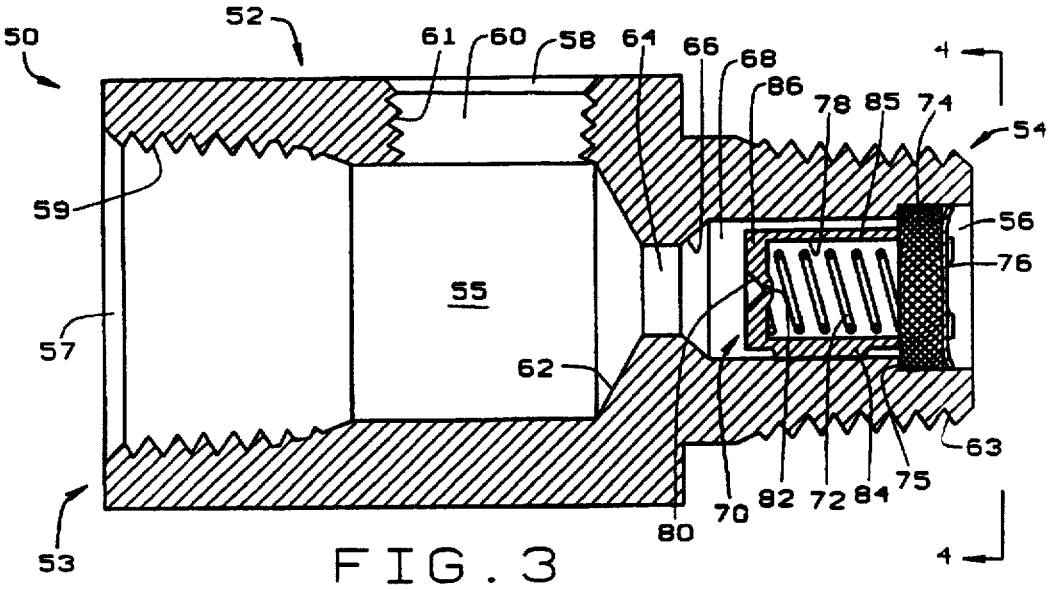
FIG. 3
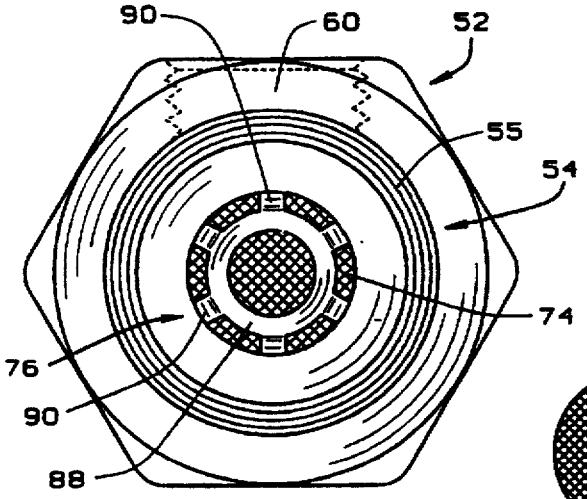
FIG. 4
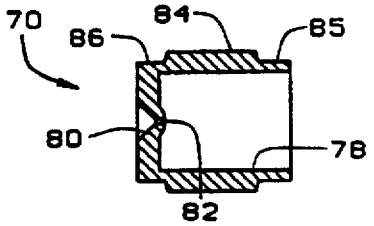
FIG. 5
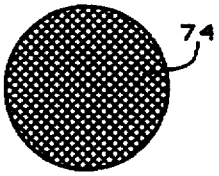
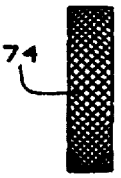
FIG. 7 FIG. 8
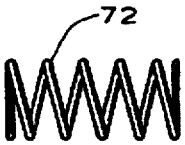
FIG. 9
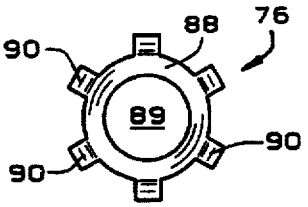
FIG. 10
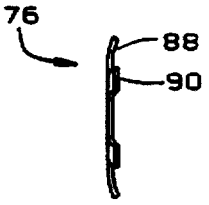
FIG. 11

GAUGE BLOCK HAVING CHECK VALVE WITH ORIFICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to the filling of oxygen cylinders and, more particularly, to a gauge block assembly for transfilling of high pressure gaseous oxygen cylinders.

2. Description of the Prior Art

In the medical industry gaseous oxygen contained within high pressure cylinders is frequently utilized. These cylinders come in a variety of sizes and shapes. Because of the durable construction of the cylinder tanks, it is not practical, from an economic or monetary viewpoint, to simply dispose of the cylinders when the oxygen within them has been exhausted.

Instead of disposing of the cylinders, the cylinders may be refilled with gaseous oxygen. In order to refill the cylinders, it is first necessary to empty or evacuate any remaining or residual oxygen and/or contaminants from the cylinder. This is accomplished by applying a vacuum to the interior of the cylinder and drawing out the remaining contents. Once this is complete, a partial vacuum exists inside the cylinder. The now empty cylinder is then refilled with fresh oxygen under a predetermined pressure.

Because of the nature and use of oxygen contained within high pressure cylinders, the refilling of such cylinders with oxygen is regulated by the Food and Drug Administration (FDA). One aspect regulated by the FDA is the filling rate of the high pressure oxygen cylinders. A cylinder will heat as it is filled from a high pressure source. The more rapidly the cylinder is filled, the higher the temperature will rise in the cylinder due to the heat of compression. Excessive temperatures my result in the ignition of any combustibles that may be present, as well as causing structural damage to the cylinders, which can undermine the integrity of the cylinders. FDA regulations thus set forth a maximum incoming gaseous flow rate for refilling of the cylinders. This flow rate cannot be exceeded.

The full flow cylinder pressures generally fall within 2K-3K PSIG. However, although the FDA regulations state that the cylinders must be evacuated to at least 25 inches (635 MM) of mercury, at seal level, the evacuation flow rate is not a regulated aspect. Thus, the evacuation process may transpire unrestricted, flowing at the maximum rate of the totally open flow valve, while the filling process is restricted to a maximum flow rate.

In view of the FDA regulations, prior art regulators for gas flow control in the refilling of high pressure oxygen cylinders utilize a restricted straight through orifice. This is the gas flow path for both the evacuation and refilling processes. Because this is the case, the orifice is thus sized to permit the maximum rate of gaseous flow into the cylinder as allowed by FDA regulations for refilling. This however, also limits the evacuation flow rate. Thus, although the evacuation flow rate is not regulated by the FDA and may therefore transpire at any rate, the use by prior art devices of a restricted orifice for both evacuation and refilling in order to adhere to the FDA regulations setting the maximum refilling flow rate, increases the overall time it takes to complete the entire refill process.

The evacuation time for three "E" type high pressure cylinders utilizing prior art restricted orifices is found to be approximately 12.5 minutes. Also, the overall process includes refilling the cylinders with oxygen, which would double the time for completing the entire process. Thus, very few cylinders may be refilled in a given period of time.

There is thus a need for decreasing the total overall time necessary to complete the entire refilling process in order to be able to process more cylinders in a given period of time.

It is thus an object of the present invention to decrease the overall time necessary to evacuate and refill a high pressure cylinder with oxygen.

It is therefore an object of the present invention to provide a gauge block assembly for the oxygen transfill process that increases the evacuation flow rate so as to decrease the total evacuation time, while also not exceeding the maximum fill rate established by regulation.

SUMMARY OF THE INVENTION

The present invention accomplishes the above objects by providing a gauge block assembly for an oxygen transfill system that includes a check valve assembly with a restricted orifice therethrough.

During the evacuation process, the check valve within the gauge block opens under a vacuum pressure to allow a first rate of flow around the check valve, bypassing the restricted orifice. Then, during the refilling process, the check valve closes under positive pressure such that the incoming gas is caused to flow through the restricted orifice. The incoming gas enters at a second rate of flow that is less than the first rate of flow, but equal to the maximum rate of flow permitted by regulation.

In one form thereof, the present invention provides a gauge block assembly for an oxygen transfill apparatus. The gauge block includes a body having a longitudinally extending.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings. Corresponding reference characters indicate corresponding parts throughout the several view.

It is noted, however, that the appended drawings illustrate only a typical embodiment of this invention and is therefore not to be considered limiting of its scope, for the invention may admit to other equally effective embodiments. Reference the appended drawings, wherein:

FIG. 3 is an enlarged sectional view of a gauge block assembly depicting the valve subassembly in a vacuum pulling position;

FIG. 4 is an enlarged side view of the gauge block taken along line 4—4 of FIG. 3;

FIG. 5 is an enlarged sectional view of the restrictor valve element;

FIG. 7 is an enlarged top view of the filter element;

FIG. 8 is an enlarged side view of the filter element;

FIG. 9 is an enlarged side view of the spring;

FIG. 10 is an enlarged top view of the retaining ring; and

FIG. 11 is an enlarged side view of the retaining ring.

DESCRIPTION OF THE PREFERRED EMBODIMENT

Figure 1:
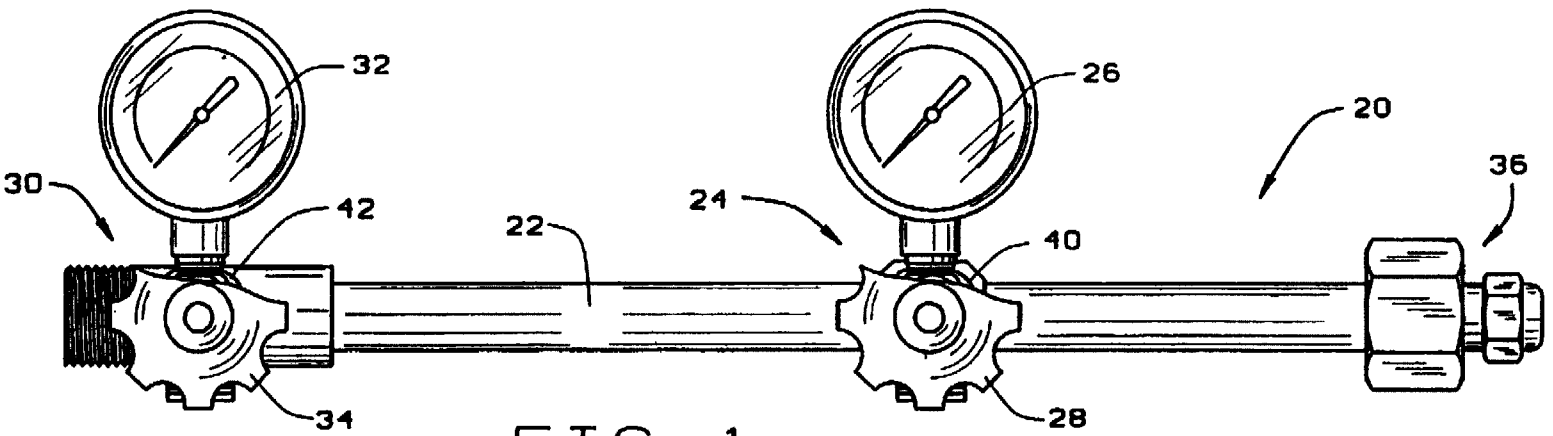
FIG. 1 is an elevational view of a header extension in which is disposed a gauge block having a check valve in accordance with the present invention.

Referring now to FIG. 1 there is shown a fill side header extension 20 being part of an oxygen transfilling system. Fill side header extension 20 includes a tube or conduit 22 with a regulator coupling 36 at one end. Regulator coupling 36 is adapted to releasably attach to one end of a supply regulator/gauge assembly (not shown). A supply side header extension (not shown) is coupled to another end of the supply regulator/gauge assembly and is adapted to connect to a plurality of oxygen supply cylinders, typically "H" type cylinders. The "H" type cylinders hold the oxygen for transfilling.

Disposed along the length of conduit 22 is a first valve assembly 24 with regulator knob 28 including a contents gauge 26, and a second valve assembly 30 with regulator knob 34 including a contents gauge 32. It should be noted that any umber of valve assemblies may be disposed along conduit 22 for refilling that number of cylinders, but for purposes of illustration, only two such assemblages are shown. Valve assembly 24 is coupled to a gauge block housing 40 while valve assembly 30 is coupled to a gauge block housing 42. Likewise, each valve assembly that is connected to conduit 22 is also coupled to a gauge block housing. Each gauge block housing 40, 42 includes a gauge block assembly therein, described hereinbelow, in accordance with the present invention.

Fill side header extension 20 is utilized to connect a plurality of and allow fluid communication between spent oxygen cylinders (not shown), typically "E" type oxygen cylinders, via pigtails (not shown) with the oxygen supply cylinders (not shown), typically "H" type cylinders, and with a vacuum or evacuation pump (not shown). A pigtail connects with the gauge block housing at one end, and to the cylinder to be filled at the other end. A supply side header extension (not shown) is coupled via a regulator (not shown) to connector 36, and is attached via pigtails (not shown) to a plurality of oxygen supply cylinders. In this manner, supply oxygen is furnished to fill side header extension 20 from the connector 30 side.

A valve assembly (see valve assemblies 24, 30) is provided along conduit 22 for every spent oxygen cylinder that the user desires to refill during a refill operation. Thus, there is a gauge block assembly, described hereinbelow, for each valve assembly. The gauge block assembly provides controlled evacuation and refilling of the spent oxygen cylinders as explained hereinbelow in connection with the operation of the gauge block assembly.

Figure 2:
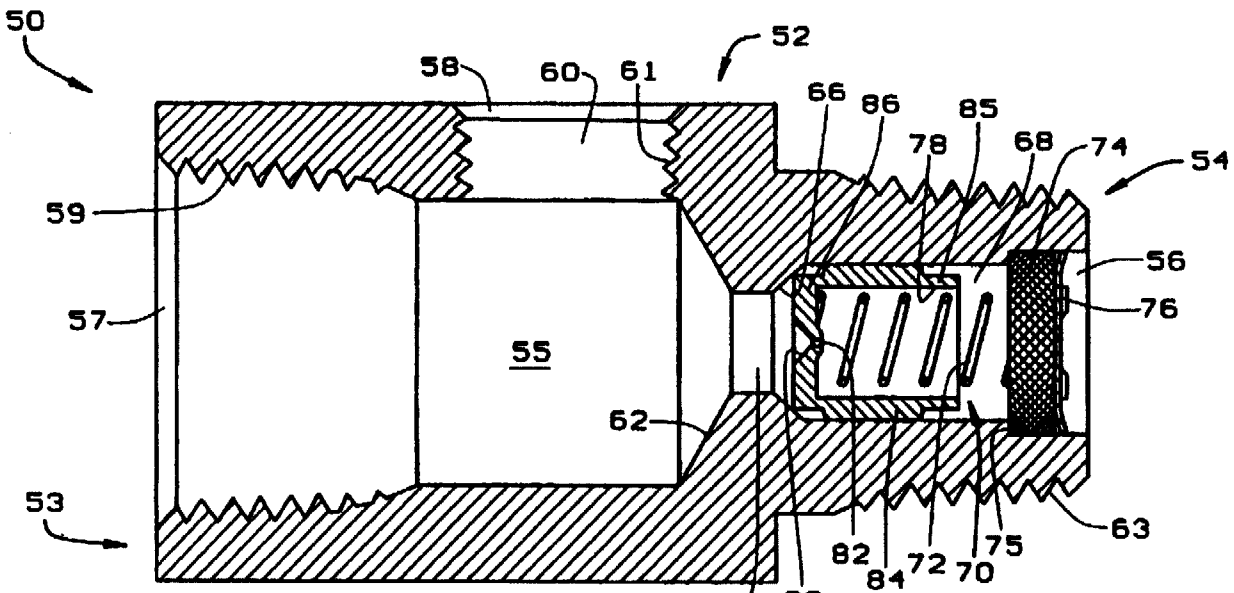
FIG. 2 is an enlarged sectional view of a gauge block assembly depicting the valve subassembly in a filling position.

In accordance with the present invention a gauge block assembly 50, one of which is disposed within each of the gauge block housings of the valve assemblies, is shown in detail in FIG. 2. Gauge block assembly 50 includes a body 52 that is preferably fabricated from brass, but which can be of a material that will withstand the applied pressures while at the same time also not react with oxygen so as to avoid contamination or adulteration thereof. Body 52 includes a first portion 53 and a second portion 54 disposed at one end of first portion 53 and integrally formed therewith. First portion 53 has an outer surface of a hexagonal shape (see FIG. 4) and a longitudinal bore 55 therethrough that defines an opening 57 at one longitudinal end opposite second portion 54. Internal threads 59 are disposed at opening 57 for connection to valve 24 or 30 (FIG. 1).

First portion 53 further includes a bore 60 disposed transverse to bore 55 that defines an opening 58. Opening 58 has internal threads 61 for threaded engagement with a gauge (26 or 32 in FIG. 1). At the end proximate second portion 54, bore 55 reduces in diameter via annular taper 62 to a lesser diameter aperture 64.

Second portion 54 has a generally annular outer surface configuration with external threads 63 that extend approximately three-quarters of the longitudinal length thereof. A bore 68 longitudinally extends through second portion 54. Bore 68 includes an annular taper 66 at an end proximate first portion 53 and is in communication with longitudinal bore 55 of first portion 53 via aperture 64. At the end distal taper 66 there is formed a ledge 75 that defines the beginning of an opening 56. Bore 68 also defines a valve chamber. Ledge 75 provides a seat for filter element 74 so that filter element 74 is maintained at opening 56.

Figure 6:
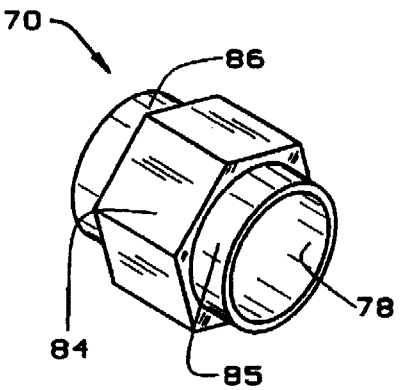
FIG. 6 is an enlarged perspective view of the restrictor valve element.

Disposed within bore or valve chamber 68 is a longitudinally movable restrictor or valve element 70 and a spring 72. In a preferred form, valve element 70 is fabricated from brass, but my be formed from any material suitable for the present application. Referring additionally to FIGS. 5 and 6, valve element 70 is generally cylindrical-shaped having a front cylindrical portion 85 and a rear cylindrical portion 86 with a hexagonal portion 84 therebetween. A longitudinal cup-like interior 78 is defined from front portion 85 that receives an end of spring 72 when disposed within valve chamber 68. As can be most easily discerned from FIG. 5, rear portion 86 includes an orifice, aperture, or restriction 82 centrally disposed within conical concavity 80. Restriction 82 is sized in accordance with permitting a predetermined rate of gaseous flow therethrough. In accordance with an aspect of the present invention, restrictor 82 is sized according to the FDA regulations for maximum incoming oxygen flow rate.

The hexagon-shape of middle portion 84 permits a controlled flow rate of gaseous oxygen around restrictor 70 when restrictor 70 is in the open position as depicted in FIG. 3. This occurs when a vacuum is pulled as explained in detail hereinbelow in conjunction with the operation of the present gauge block assembly.

Spring 72 has one end seated against filter 74 with the other end seated against an end of interior 78. Restrictor 70 is thus normally biased by spring 72 in a closed position.

Filter 74 is shown in detail in FIGS. 7 and 8. In a preferred form, filter 74 is a 50 micron sintered metal bronze filter of 90% copper and 10% tin, although it should be appreciated that a filter of another material may be utilized that does not react with oxygen. Such a filter is manufactured by Avenger Metals, Ipswich, Mass. Filter 74 is disc-shaped and is sized to snugly but retainingly fit within opening 56 and rest on annular ledge 75.

Referring now to FIG. 9 there is shown spring 72. In a preferred form, spring 72 is a 0.011 size wire coil producing a load of 0.063 to 0.077 lbs. at a length of 0.250 inches, and manufactured of stainless steel type 302. It should be recognized that other materials may be utilized consistent with the non-reaction requirement with oxygen and within the pounds rating. Spring 72 is not necessary for the operation of the valve assembly. Rather, spring 72 prevents rattling of restrictor element 70 and helps to provide proper seating thereof within bore/valve chamber 68.

The retaining ring 76 is depicted in FIGS. 10 and 11. Retaining ring 76 includes a central ring or hub 88 with a central cutout portion 89. In the preferred form, retaining ring 76 is fabricated from a stainless steel type PH 15-7Mo or equivalent, although other materials may be utilized that will not react with oxygen. Radially disposed about the periphery of ring 88 are six flanges collectively labeled 90 that slightly axially upwardly curve as best seen in FIG. 11. The outside diameter surface of retaining ring 76 taken about the edges of flanges 90 is sized to abut the inside diameter of opening 56. Retaining ring 76 functions to retain filter element 74 within opening 56 and seated against ledge 75. When installed, retaining ring 76 is oriented such that flanges 90 extend axially outward relative filter element 74.

The manner of operation of the present gauge block assembly will now be described with initial reference to FIG. 2. As depicted in FIG. 2, restrictor 70 is biased via spring 72 into a first position wherein rear portion 86 is seated against annular taper 66. As noted above however, spring 72 is not a necessary component for the operation of the present gauge block assembly since pressures alone developed during the evacuation and refilling process suffice to actuate restrictor 70. Although spring 72 may serve to bias restrictor 70 into a closed position, spring 72 also prevents rattling of restrictor 70 within chamber 68. Thus, since restrictor 70 is totally responsive to the pressures exerted thereon as described hereinbelow, spring 72 need not be necessary.

FIG. 2 depicts the orientation of gauge block assembly 50 for the orientation of fill side header extension 20 depicted in FIG. 1. Initially, it should be understood that both the vacuum pressure and the positive supply pressure are applied to opening 56 of gauge block assembly 50. The spent oxygen cylinders (not shown) are connected to the respective valve assembly via the pigtails. A vacuum pressure is applied to the cylinders via a vacuum pump (not shown). The vacuum pressure is applied in order to evacuate any remaining contents from the cylinders. As the vacuum is applied to opening 56, the reduced pressure causes restrictor 70 to unseat from seat or annular taper 66 regardless of the presence of spring 72. Referring to FIG. 3, this condition is depicted. Any remaining contents from the cylinders being evacuated may thus flow around the restrictor 70 between the outside surface of restrictor 70 and the inside surface of portion 54 defining chamber 68. Thus, there is an almost unrestricted gaseous flow rate.

When a proper vacuum has been achieved, refilling of the spent cylinders may proceed. After closing the appropriate valves of the headers and regulators, the new oxygen is caused to flow into opening 56. The positive pressure created by the inflow of gas into restrictor 70 causes restrictor 70 to seat against annular taper 66 such that the gas must flow through restriction 82. This, then slows down the rate of flow as determined by the size of restrictor 82.

For purposes of clarity, the restrictor 70 depicted in FIG. 3 is oriented such that the top outer hexagon surface is essentially parallel to the inner surface of chamber 68 in cross section. This permits the understanding of the gas flow pattern around the restrictor 70 when in the open or vacuum pressure position.

While the foregoing is directed towards the preferred embodiment of the present invention, other and further embodiments of the invention may be devised without departing from the basic scope thereof, and the scope thereof is determined by the claims which follow.

What is claimed:

1. A gauge block assembly for gas transfilling apparatus, the gauge block assembly comprising:

a body having a first end and a second end, said body including a gas passageway therethrough defining a first opening in said first end, and a second opening in said second end;

gas transfer control means disposed in said gas passageway for regulating the flow of gas through said gas passageway, said gas transfer control means adapted to be actuated into a fill position when [a positive pressure is applied to] *pressure at* said first opening *is greater than pressure at said second opening*, the fill position permitting [a] *gas flow through the passageway from the first opening to the second opening at a first* restricted gas flow rate [between said second opening and said first opening], said gas transfer control means adapted to be actuated into an evacuation position when [a negative pressure is applied to] *pressure at* said first opening *is less than pressure at said second opening*, the evacuation position permitting [an unrestricted] *gas flow through the passageway from the second opening to the first opening at a second* gas flow rate [between said first opening and said second opening,] *greater than said first gas flow rate*, said gas transfer control means including a valve member adapted to [restrictively] longitudinally move in said gas passageway in a first direction [defining] *toward* the evacuation position, and a second direction [defining] *toward* the fill position, said valve member having an [elongated concave surface formed at one end thereof and an] orifice therethrough providing restricted communication between said *first end of the body and said* second end [and said concave surface, said valve member oriented within said gas passageway such that said concave surface is disposed proximate said first end] *of the body*; and a filter element retainingly held in said passageway [proximate said first opening, said filter element restricting longitudinal movement of said valve member in the first longitudinal direction of movement] *between said first end and the valve member*.

2. A gauge block assembly for a gas transfilling apparatus, the gauge block assembly comprising:

a body having a gas passageway therethrough, said gas passageway defining a first opening on a first end of said body, and a second opening on a second end of said body;

a seat formed within said gas passageway [proximate said first end, said seat defined by a radially inwardly extending ledge];

a valve member disposed in said gas passageway and adapted to [restrictively] longitudinally move therein, said valve member *being* restricted in longitudinal movement in a first direction by said seat[, said valve member having a longitudinally extending concave surface formed at one end thereof, said valve member oriented within said gas passageway such that said concave surface is disposed proximate said second end];

a filter disposed [proximate said second end, said filter longitudinally restricting movement of said valve member in a second direction] *in the gas passageway between the valve member and said first end*;

means for retaining said filter [at said second end] *in the gas passageway*; and an aperture formed in said valve member providing communication *through the gas passageway* between said first end and said second end [via said concave surface];

said valve member *being* longitudinally movable into a fill position when [a positive pressure is applied to] *pressure at* said second opening *is less than pressure at said first opening* such that said valve member abuts said seat and said aperture permits [a] *gas to flow through the gas passageway from the first opening to the second opening at a first* restricted flow rate [from said second opening to said first opening], said valve member *being* longitudinally movable into an evacuation position when [a negative pressure is applied to] *pressure at* said second opening *is greater than pressure at said first opening* such that said valve member unseats from said seat and permits [an unrestricted] *gas to bypass said valve member aperture and to flow through the gas passageway from the second opening to the first opening at a second* flow rate [around said valve member from said first opening to said second opening] *greater than said first flow rate.*

3. The gauge block assembly of claim 2, wherein said retaining means includes:

a radially inwardly projecting [annular] ledge formed within said gas passageway [proximate said first end, said ledge defining a seat for said filter]; and a retaining ring for holding said filter against said ledge, said retaining ring having *at least one* radially outwardly extending [flanges] *flange* that [abut] *abuts* an inner [annular] surface of said [second opening] *gas passageway.*

4. The gauge block assembly of claim 3, wherein [said negative pressure is supplied by] a vacuum pump *supplies pressure to move the valve member into the evacuation position*, and [said positive pressure is provided by] oxygen under pressure *provides pressure to move the valve member into the fill position.*

5. The gauge assembly of claim 2, further comprising:

an adjustable valve for controlling the flow of residual oxygen from a spent oxygen cylinder that is in communication with the gauge block assembly into said valve member; and a meter in communication with said gas passageway for determining pressure within said gas passageway.

* * * * *